United States Patent [19]
Goodman et al.

[11] Patent Number: 5,666,487
[45] Date of Patent: Sep. 9, 1997

[54] NETWORK PROVIDING SIGNALS OF DIFFERENT FORMATS TO A USER BY MULTIPLEXING COMPRESSED BROADBAND DATA WITH DATA OF A DIFFERENT FORMAT INTO MPEG ENCODED DATA STREAM

[75] Inventors: William Goodman, Collegeville, Pa.; Kamran Sistanizadeh, Arlington; Michael J. Black, Fairfax Station, both of Va.

[73] Assignee: Bell Atlantic Network Services, Inc., Arlington, Va.

[21] Appl. No.: 495,926

[22] Filed: Jun. 28, 1995

[51] Int. Cl.$^6$ ............................................. G06F 13/00
[52] U.S. Cl. ................. 395/200.76; 370/395; 348/384; 382/232
[58] Field of Search ................. 358/85, 86, 146, 358/112; 359/125; 455/4; 380/14, 20, 49; 348/412, 467, 8; 370/73, 110.1, 17, 94.2, 60.1, 84, 396, 397, 99; 375/357; 395/114; 379/90

[56] References Cited

U.S. PATENT DOCUMENTS

| | | | |
|---|---|---|---|
| 4,461,032 | 7/1984 | Skerlos | 455/4 |
| 4,623,920 | 11/1986 | Dufresne et al. | 358/112 |
| 4,893,306 | 1/1990 | Chao et al. | 370/94.2 |
| 5,136,411 | 8/1992 | Paik et al. | 359/125 |
| 5,195,092 | 3/1993 | Wilson et al. | 370/94.2 |
| 5,220,420 | 6/1993 | Hoarty et al. | 358/86 |
| 5,231,494 | 7/1993 | Wachob | 358/146 |
| 5,247,347 | 9/1993 | Litteral et al. | 358/85 |
| 5,319,707 | 6/1994 | Wasilewski et al. | 380/14 |
| 5,325,423 | 6/1994 | Lewis | 379/90 |
| 5,365,590 | 11/1994 | Brame | 380/49 |
| 5,412,724 | 5/1995 | Mary | 380/20 |
| 5,418,782 | 5/1995 | Wasilewski | 370/73 |
| 5,420,866 | 5/1995 | Wasilewski | 370/110.1 |
| 5,467,342 | 11/1995 | Logston et al. | 370/17 |
| 5,467,349 | 11/1995 | Huey et al. | 370/60.1 |
| 5,488,411 | 1/1996 | Lewis | 348/9 |
| 5,497,404 | 3/1996 | Grover et al. | 375/357 |
| 5,506,944 | 4/1996 | Gentile | 395/114 |
| 5,517,246 | 5/1996 | Suzuki | 348/412 |
| 5,517,250 | 5/1996 | Hoogenboom et al. | 348/467 |
| 5,563,884 | 10/1996 | Fimoff et al. | 370/84 |
| 5,583,863 | 12/1996 | Darr, Jr. et al. | 370/17 |
| 5,583,864 | 12/1996 | Lightfoot et al. | 370/396 |

OTHER PUBLICATIONS

"Architecture to Implement the Reassembly Function for Asynchronous Transfer Mode," IBM TDB, vol. 35, pp. 375–378 Dec. 1992.

*Primary Examiner*—Thomas C. Lee
*Assistant Examiner*—Duo Chen
*Attorney, Agent, or Firm*—Lowe, Price, LeBlanc & Becker

[57] ABSTRACT

A distribution network has an architecture that distributes data of any format over a wide serving area. An access subnetwork receives broadband data from a plurality of information providers, preferably at least some of which are received as compressed, digital signals using asynchronous transfer mode (ATM) transport. The access subnetwork combines the broadband data from different information providers, identifies the format of the data and outputs a consolidated MPEG encoded signal to a network interface module of an end user. The network interface module receives the consolidated MPEG encoded signal and converts the consolidated MPEG encoded signal into data packets in accordance with PID values identifying the format of the data. The network interface module performs MPEG and other processing on received packet data streams, and outputs information to a corresponding digital entertainment on the basis of corresponding PID values, resulting in efficient transport of data of any format.

25 Claims, 6 Drawing Sheets

NETWORK PROVIDING SIGNALS OF
DIFFERENT FORMATS TO A USER BY
MULTIPLEXING COMPRESSED
BROADBAND DATA WITH DATA OF A
DIFFERENT FORMAT INTO MPEG
ENCODED DATA STREAM

FIELD OF THE INVENTION

The present invention relates to digital networks offering a full range of digital communications by transporting compressed digital information using a compression algorithm.

BACKGROUND OF THE RELATED ART

Known loop distribution systems (or access subnetworks) handle upstream and downstream data other than video data in a manner which is similar to that of a model Ethernet LAN. These known loop distribution systems are quite restrictive in either the manner in which non-video data is transported or in the type of non-video data which may be transported. As used in this application, the term "data" also includes control signals associated with a video connection or some other non-video application.

Typically, the downstream "data" is routed on a shared channel or other facility shared among a number of end users using IP packets ("IP" stands for Internet Protocol) and IP formatting. Each user on the network is assigned an "address" and a stream of IP packets containing data is forwarded to a particular user by attaching their address onto the stream of IP packets. However, the address is not used to direct the IP packets to particular equipment or to a particular physical destination. Rather, the stream of IP packets is made generally available on the network and users filter out the stream(s) of IP packets intended for them by using hardware or software which looks for their respective address.

The upstream "data" is typically routed using time division multiple access (TDMA) which assigns respectively different time slots for transmission to different users. Data for each user is sent upstream only during the timeslot assigned for that user. If necessary, packets of information from a single user can be distributed among successive timeslots assigned to that user. Once all of the upstream data gets into the shared channel or other shared facility of the distribution system, the origin of the packets of information can be identified from the time slots in which they are present and the information originating from one user can be reassembled by receiving equipment into its original form. The reassembled information can be distributed in the same manner as the downstream data using IP routing.

The Integrated Services Digital Network (ISDN) provides users with security and access to a 2B+D channel, in which each one of the two "B" channels guarantees 64 kilobits to the user whether they are using it or not. However, ISDN and IP are inflexible because they are reliant upon and restricted to a specific protocol, such as IP or ISDN.

Attempts have been made to improve the core switching, multiplexing and transmission technologies for integrated digital networks to support voice, data and video services from VIPs for multiple users. For example, fiber optic transmission systems with bandwidths ranging from 155.52 to 2,488.32 Mbps have been considered to improve bandwidth access. In addition, asynchronous transfer mode (ATM) has been developed as a technique to provide broadbandwidth, low delay, packet-like switching and multiplexing in backbone networks. In ATM, usable capacity can be assigned dynamically (on demand) by allocating bandwidth capacity to supply fixed-sized information-bearing units called "cells" to point-to-point or multi-point outputs. Each cell contains header and information fields. The ATM standard, CCITT.121/2 specifies a 53 byte cell which includes a 5 byte header and a 48 byte payload.

However, customer premises equipment such as settop boxes generally cannot accept ATM and utilize an MPEG (moving picture experts group) standard for digital video program compression. A number of specific compression algorithms satisfy MPEG requirements. MPEG-2 is a second generation compression standard capable of encoding video program material into a 6 Mbits/sec bit stream and packetizing a number of 6 Mbits/sec channel streams into a single higher rate signal transport stream. The conversion of MPEG-2 data into ATM cell format, however, imposes additional overhead requirements that reduce the information-carrying capacity of the network. For example, synchronous transmission protocols, such as SONET, may require a stream of continuous data to retain synchronization. Thus, an ATM data stream carrying MPEG video data that is transmitted on a synchronous carrier may need to be padded with ATM idle cells, or "dummy cells", in order to ensure proper synchronization with the physical layer.

FIG. 1 depicts an example of a video network utilizing a hybrid fiber-coax system which provides RF transport of both analog and digital broadband services as well as a variety of data communications. The illustrated network provides broadcast video distribution, archival video services and interactive multi-media services as well as plain old telephone service. As discussed below, the data communications utilize IP addressing. To facilitate understanding, an overview of the network is given followed by a discussion of data transport through the network.

The network of FIG. 1 includes a Loop Transport Interface 10 located in a telco central office. In an area serviced through multiple central offices, several different central offices would each have a Loop Transport Interface similar in structure to the Interface 10 depicted in FIG. 1. In some respects, each Loop Transport Interface serves as the head-end of an otherwise conventional optical fiber trunk and coaxial cable type CATV distribution network.

In the Loop Transport Interface 10, a laser type optical transmitter 12 transmits downstream signals through fibers 14 to optical to electrical nodes referred to as "optical network units" or ONU's. The laser operates in a linear mode in the range of 5–750 MHz. The transmitter 12 is followed by an optical splitter and can transmit to several ONU nodes 16. Each ONU 16 performs optical to electrical conversion on the downstream signals and supplies downstream RF electrical signals to a coaxial cable distribution system 18.

The optical transmitter receives and transmits signals from an RF (radio frequency) combiner 20. The combiner 20 combines levelized RF signals from several sources to produce the appropriate signal spectrum for driving the optical transmitter 12. One set of signals supplied to the RF combiner 20 are group of AM-VSB (amplitude modulated vestigial sideband) analog television signals 22 from one or more appropriate sources (not shown). Such signals are essentially "in-the-clear" CATV type broadcast signals capable of reception by any subscriber's cable ready television set. The analog television signals are broadcast from the optical transmitter 12 through the tree and branch optical and coax distribution network to provide "basic" CATV type service to all subscribers on the network. In order to obtain additional network services as discussed below, the subscriber may obtain a digital entertainment (DET) 24. A network interface module in the DET 24 includes a tuner that permits subscribers to the digital services to receive the analog broadcast channels through the same equipment used for the digital services. The network depicted in FIG. 1 also provides transport for digitized and compressed audio/video programming, both for certain broadcast services and for interactive services, such as video on demand. The network uses MPEG encoded video, which is transported to each Loop Transport Interface using asynchronous transfer mode (ATM) transport and switching. In the illustrated network, digital broadcast service signals 26 in MPEG encoded form and arranged in ATM cell packets are applied to an ATM packet demultiplexer 28 in the Loop Transport Interface 10. These broadcast service signals 26 originate in one or more broadcast VIP's ATM encoders controlled by the VIP servers. The ATM broadcast services carry premium service type programming. For certain interactive services which utilize one digitized channel to provide limited downstream transport to a large number of subscribers, the ATM broadcast cell stream signals originate from a server 30. Fully interactive broadband digital signals, in MPEG-ATM format, are also applied to the ATM packet demultiplexer 28 from an ATM switch 32. The ATM packet demultiplexer 28 terminates all ATM cell transport through the network, and converts the cell payload information into a plurality of MPEG-2 format bit streams.

In addition to the analog broadcast signals, the RF combiner 20 receives a variety of other analog RF signals from a group of RF digital modulators 34 that output the MPEG streams from the ATM packet demultiplexer 28 as digital broadband information in RF analog format. Each RF modulator 34 outputs a 6 MHz bandwidth IF signal which an upconverter (not shown) tunes to a different RF channel having a corresponding carrier frequency. A controller identified as the video manager 50 provides instructions to the ATM demultiplexer 28 to use the VPI/VCI header from the ATM cells to route the MPEG bit streams to the appropriate digital RF modulator 34. The video manager 50 provides the control information to the ATM packet demultiplexer 28, for example, by an ethernet bus 38a. The Ethernet bus 38a is also coupled to the network controller 36, the ACC 4000D 46, and the network data processor (NDP) 38. Thus, the video manager 50 and the ACC 4000 46 can provide control data for use by the ATM packet demultiplexer. The NDP 38 transmits downstream signaling and/or data via QPSK modulated out-of-band signaling channels. The network controller 36 receives and processes upstream signaling and/or data transmissions through upstream QPSK modulated out-of-band signaling channels.

The RF modulators 34 use 64 QAM (quadrature amplitude modulation) or 16 VSB (vestigial sideband) modulation techniques. The 64 QAM is used to modulate 4 channels of 6 Mbits/s MPEG encoded digital video information into one 6 MHz bandwidth analog channel. Similarly, 16 VSB modulates 6 channels of 6 Mbits/s MPEG encoded digital video information into one 6 MHz bandwidth analog channel.

As another example, U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard six MHz channel allocation for transmission over a CATV type distribution network.

The 6 MHz bandwidth RF signals from the modulators 34 are supplied to the optical transmitter 12 for downstream transmission together in a combined spectrum with the AM-VSB analog television signals 22. The downstream transport of the digital programming is an RF transmission essentially the same as for the analog basic service channels, but each of the channels from the RF modulators 34 contains 4 or 6 digitized and compressed video program channels, referred to hereinafter as "slots". The 6 Mhz digital program channels are carried through the fiber and coaxial system in standard CATV channels not used by the analog basic service programming. The ONU 16 is essentially transparent to both the analog basic service channels and the channels carrying the digital programming and supplies all of the signals as a combined broadcast over the coaxial cable network 18.

At the subscriber premises, a network interface module (NIM) (not shown) couples the set-top device or digital entertainment terminal (DET) 24 to a drop cable of the coaxial distribution network 18. In this network configuration, the NIM includes an analog frequency tuner controlled by a microprocessor to selectively receive the RF channel signals, including those channels carrying digital information. The NIM also includes a QPSK, QAM or VSB demodulator to demodulate a selected one of the digitized program signals carried in one of the digital slots within a received 6 MHz channel and performs a forward error correction function on the demodulated data. A digital audio/video signal processor within the DET decompresses received video signals, generates graphics display information and performs digital to analog conversion to produce output signals compatible with a conventional television set 40.

The analog tuner in the NIM tunes in all channel frequencies carried by the network, including those used for the analog broadcast services. The DET 24 includes a bypass switch in the NIM and an analog demodulator to selectively supply analog signals from the basic service channels directly to the audio/video output terminals or to the modulator, to provide signals to drive a standard television receiver.

The DET 24 also includes a remote control and/or keypad to receive various selection signals from a user. The DET relays data signals upstream over a QPSK signaling channel on the coaxial cable to the ONU 16 in response to user inputs such as selection of a pay per view event. The actual transmission of any such data signals upstream from the DET 24 occurs in response to a polling of the DET. The ONU 16 combines upstream data signals from the DET's serviced thereby and transmits those signals upstream over another optical fiber 42 to an optical receiver 44 in the Loop Transport Interface 10. Each DET 24 may transmit data on a different carrier frequency or timeslot, in which case the network controller 36 knows which DET sent particular data based on the received frequency channel. Alternatively, for interactive services, the DET may transmit a unique identification code with the upstream message.

In the implementation of the network illustrated in FIG. 1, an ACC 4000D 46 performs set top management and specific program access control functions. Service profiles for each customer on the network and their DET's are set up and stored within the ACC 4000D 46. The ACC 4000D 46 may also provide an interface to appropriate billing systems (not shown) for some broadcast services, such as pay per view. For ATM broadcast services, when a subscriber first signs up, a portfolio of channels subscribed to by that customer is established in the subscriber's profile data within the ACC 4000D 46. Based on this profile data, the ACC 4000D 46 downloads a service map into the subscriber's DET 24. The downstream transmission portion of the network provides an out-of-band downstream signalling channel to the DET's using internet protocol (IP) addressing. For example, for the downloading of the service map information from the ACC 4000D 46 to each DET 24, the ACC 4000D 46 outputs the service map information to the network data processor (NDP) 38 via the Ethernet 38a. The NDP includes a QPSK modulator for modulating the service map information onto the out-of-band downstream signaling channel. The modulated signals are then output to the RF combiner 20. At the subscriber site, the subscribers' DET/NIM would recognize, capture and process the out-of-band signaling data based on the corresponding IP address. This downstream signaling channel also carries signals for controlling software downloading and/or selection of certain channels or frames for decoding in interactive services.

All digital broadcast service signals are broadcast into each subscriber's premises, and each DET 24 includes means for receiving and decoding each such digital broadcast service channel, which may include premium channels. The microprocessor in the DET 24 controls access to any of these channels based on the downloaded map information stored in the system memory. For example, if one subscriber requests HBO, and that subscriber has paid to subscribe to HBO, the subscriber's DET 24 contains map information instructing it to tune to the RF channel and select and decode the digital program slot carrying HBO for display on the subscriber's television set 40. However, if a requesting subscriber has not paid for HBO, the downloaded service map will not provide the requisite data for tuning and decoding of that channel. If a decryption key is needed, the Level 1 Gateway 48 instructs the video manager 50 to instruct the ACC 4000D 46 to transmit the key to subscriber's DET 24.

The implementation of the network illustrated in FIG. 1 also provides telephone service. Between the optical network unit and the subscriber premises, the 700–750 MHz portion of the spectrum on the coaxial cable carries the telephone signals. This allocated spectrum provides transport for 24 DS0 telephone channels. Each subscriber premises has a telephone interface referred to as a Cable Network Unit (CNU) 52 coupled to the coaxial cable which serves to couple two-way signals between a twisted wire pair into the home and the telephone frequency channels on the coaxial cable 18. Upstream telephone signals are applied from the optical receiver 44 to a host digital terminal (HDT) 54 which provides an interface to a standard digital telephone switch 56. Downstream telephone signals from the switch 56 pass through the HDT 54 to the RF combiner 20 for transmission in the 700–750 MHz frequency range over the fiber to the ONU 16 and the coaxial cable distribution system 18. Upstream telephone signals are output in the 5–40 MHz frequency range of the coaxial cable, which are block converted in the fiber nodes for transport on an optical fiber.

The implementation of the network illustrated in FIG. 1 also offers access to video information providers (VIP's) for interactive broadband services, such as video on demand. For archival services and many other interactive services, each VIP has a level 2 gateway and some form of broadband information file server 403. The ATM switch 32 provides communications links between the Loop Transport Interfaces 10 and the level 2 gateways and file servers 60. Customer access to the VIP's is controlled through one or possibly more programmed computer or processor elements performing the processing functions of the Level 1 Gateway 48. A permanent virtual circuit (PVC) controller 56 and a video manager 50 respond to signals from the Level 1 Gateway to control the point to point routing through the network.

The PVC controller 56 stores data tables defining all possible virtual circuits through the ATM switch 32 and the Loop Transport Interface 10 serving each DET terminal of a customer subscribing to each particular provider's services. These data tables define the header information and the switch port to the packet handlers needed to route cells to the correct Loop Transport Interface. The video manager 50 stores similar data tables identifying the transmission fiber ports, RF channels and multiplexed digital channel slots which may be used to transport each data stream processed by the ATM packet demultiplexer 28 through the fiber 14 to the appropriate ONU 16 serving each DET. The data tables in the PVC controller 56 and the video manager 50 thus define "permanent virtual circuits" between the VIP's equipment 403 and the DET's 24.

For a full, broadband interactive session, the subscriber operates the DET 24 to interact with the Level 1 Gateway 48 and select a VIP. The PVC controller 56 responds to instructions from the Level 1 Gateway by activating the ATM switch 32 to establish a downstream virtual circuit path between a port of the VIP's server and the ATM packet demultiplexer 28 within the Loop Transport Interface 10 servicing a subscriber requesting a call connection to the particular VIP. The video manager 50 assigns a particular one of the digitized video channel slots in a digital program type RF channel to carry the particular point to point communication. Specifically, the video manager controls the ATM packet demultiplexer 28 to route MPEG data recovered from the ATM cells for the particular point to point communication to the port for one of the RF modulators 34 so that the modulator will include the MPEG data in the assigned digital channel slot within a particular 6 MHz RF channel. The video manager 50 also transmits a signal downstream through NDP 38 and the signaling channel to the subscriber's DET 24 instructing the DET to tune to the particular RF channel and decode MPEG data from the specifically assigned digital channel within that RF channel. Similar dynamic assignments of RF channels on a CATV system to individual terminals for interactive services are disclosed in U.S. Pat. No. 5,220,420 to Hoarty et al. and U.S. Pat. No. 5,136,411 to Paik et al., the disclosures of which are incorporated herein in the entirety by reference.

Concurrently, the Level 1 Gateway 48 would instruct the PVC controller 56 to control the ATM switch 32 to establish an upstream virtual circuit for control signals sent from the DET 24. In such a case, the upstream signals from the DET are passed up through the fiber-coax network and receiver 44 to the network controller 36, and then the VIP's level 2, gateway via the ATM switch 32.

The network disclosed in FIG. 1 has limited flexibility in that the ATM packet demultiplexer 28 recovers MPEG data having preassigned PID values from the ATM cell streams. It would be desirable to provide an ATM packet demultiplexer that provides additional flexibility in MPEG encoding to enable dynamic MPEG encoding of ATM cell streams.

The ATM packet demultiplexer 28 also is limited in that the ATM cell streams generally must include MPEG-encoded data streams before transmission through the network. Downstream signaling from the VIP's equipment to the DET therefore must be encapsulated as user data within MPEG packets, by an encoder operated by the VIP. It would be desirable to provide an arrangement that did not necessarily require MPEG-encoded data in the ATM cells transported to the loop transport interface 10, but that was adapted to accept ATM cells carrying different data formats.

As noted, the network disclosed in FIG. 1 involves IP addressing using TCP/IP protocol. This technique, however, results in additional IP address management at the VIP and each loop transport interface, as well as additional IP processing at the DET. It is anticipated that the increased popularity of Internet will result in revision in protocol standards to accommodate increased IP address lengths, thereby increasing overhead and reducing available bandwidth on the network for signaling and data transmission. Further, the network disclosed in FIG. 1 requires different data paths for video data and signaling data, thereby complicating data transport to the DET. It would be desirable to provide a more flexible, efficient signaling communication system that transports signaling information to individual DET's.

There are at least two main disadvantages to broadcast systems using IP addressing of non-video data messages. The first is security. When using IP packets and IP information in the manner described in the preceding paragraphs, the data is made available to each user and it is intended that each user will receive only the data which is intended for them. However, since the data is provided to each user, it is possible for the data to be obtained by a user other than the one to which the stream of IP packets was addressed by hacking of equipment or other means. Therefore, there is no easy and reliable way to provide private and secure communications with a single user.

Secondly, these systems suffer from diminished performance in their capacity to transport information from point to point because data is transferred to all points, and the time which it takes to do so necessarily depends upon the amount of overall traffic in the system.

SUMMARY OF THE INVENTION

It is an object of the invention to overcome at least the aforementioned disadvantages of the known distribution systems.

It is also an object of the present invention to provide a more secure system in which data may be transported from one point to another with access restricted to others on the system.

It is also an object of the invention to provide a system having a flexible set of capabilities for handling upstream and downstream non-video data.

It is a further object of the invention to provide a distribution system of a connection oriented nature providing improved performance.

In a preferred embodiment of the invention, a distribution system of a full service network uses what will be referred to as 'any data format' riding on top of ATM and AAL5 on a connection oriented data service or data capability similar to what is done on an ATM network. In this distribution system, it is possible to take an order from a customer and reserve a specific upstream bandwidth or a specific downstream bandwidth associated with a bi-directional connection and guarantee with some level of certainty that the bandwidth will be available for two particular customers to use, and provide it in a secure manner so that all other customers do not have access to the same thing.

The preferred embodiment of the invention uses a network interface module (NIM), located between the network and a corresponding settop box, to filter out the data destined for the settop box. The settop box is preferably a digital entertainment terminal (DET) and the NIM provides security to the individual user through this filtering aspect because the only data which can be handed to each DET is the data corresponding to that DET. Therefore, data intended for one user will not be available to another user. This makes the network generally more secure because it is known that some outside hacker cannot get into the network. Therefore, an information provider can be more comfortable designing and providing applications across the network.

The preferred embodiment of the invention also provides flexibility because any data format can work with any existing or future protocol designed to ride on top of ATM AAL5 since the end user does not know and does not need to know whether the data being transported is any data or IP or TCP. The any data channel also supports an ISDN overlay so long as the information provider or other interface to the channel also has that type of an application. The network provides the capability rather than the support services and applications. The application may be video programming or one end user downloading a computer file to another end user down the street. Alternatively, an information provider might support a function in which end users call up for downloading to another end user on the network. The end user only needs to connect the serial port on a personal computer or some kind of Super Nintendo device into an interface on the DET to receive data using the any data format.

The enhanced set of network capabilities provided by the preferred embodiment of the invention in turn allows information providers to provide a broader array of applications to users. The network can provide a full range of digital services from simple video to complex non-video applications, such as an interactive game with graphics downstream and control upstream. The service may be as simple as providing a connection to an on-line data service such as Prodigy or America On-line, or to permit telebanking or work at home without going through an information provider. An upstream channel may be associated with a downstream video dial tone program and dedicated to requests for typical VCR functions such as rewind. An interactive game may require a channel of 64 kilobits per second in the downstream direction which is guaranteed to always be available so that the information provider knows that they are going to be able to deliver the level of performance to the customer end that they desire. The information provider may also require a guaranteed channel of a certain capacity upstream in order to meet maximum latency requirements of the game so that things happen quickly enough if, for example, a player is pressing a joy stick.

The preferred embodiment of the invention is advantageous because it can pass anything in a clear channel end to end and guarantee certain characteristics about the connection, the performance, the bit rate and the quality of service. There will be no degradation in latency performance if some other users are also on the network. The connection is dynamic, and the allocation of bandwidth, upstream and downstream, right out to the user is dynamic, so that the bandwidth is available when the user requests that a connection be set up. But as soon as the service is completed, the connection is torn down and the bandwidth from the connection is used for someone else, resulting in a system which is switched or dynamic.

So, for example, in a home shopping application a downstream channel having sufficient bandwidth to provide menus and graphic pictures to be displayed to the user is reserved, and a much lesser bandwidth upstream channel of that connection is reserved to take orders or responses or control commands from the user in order to do an interactive application. Another example is an information provider offering an on-line service with an asymmetrical bi-directional connection having a bit rate in the downstream direction which is much greater than that of an upstream channel used to process the upstream control characters. The amount of bandwidth to be used will be specified when the connection is made. When finished, the connection is torn down and the network reallocates and makes those resources available for some other service connection.

The connection does not always have to be from or through a information provider (IP). It may also be from one end user to another down the street without going through a VIP. Such ancillary services could contain voice for example, if the compressed voice signal is within that constraint of that MPEG transport or within the bandwidth requirement of any data format.

DETAILED DESCRIPTION OF THE PREFERRED EMBODIMENTS

Figure 2:
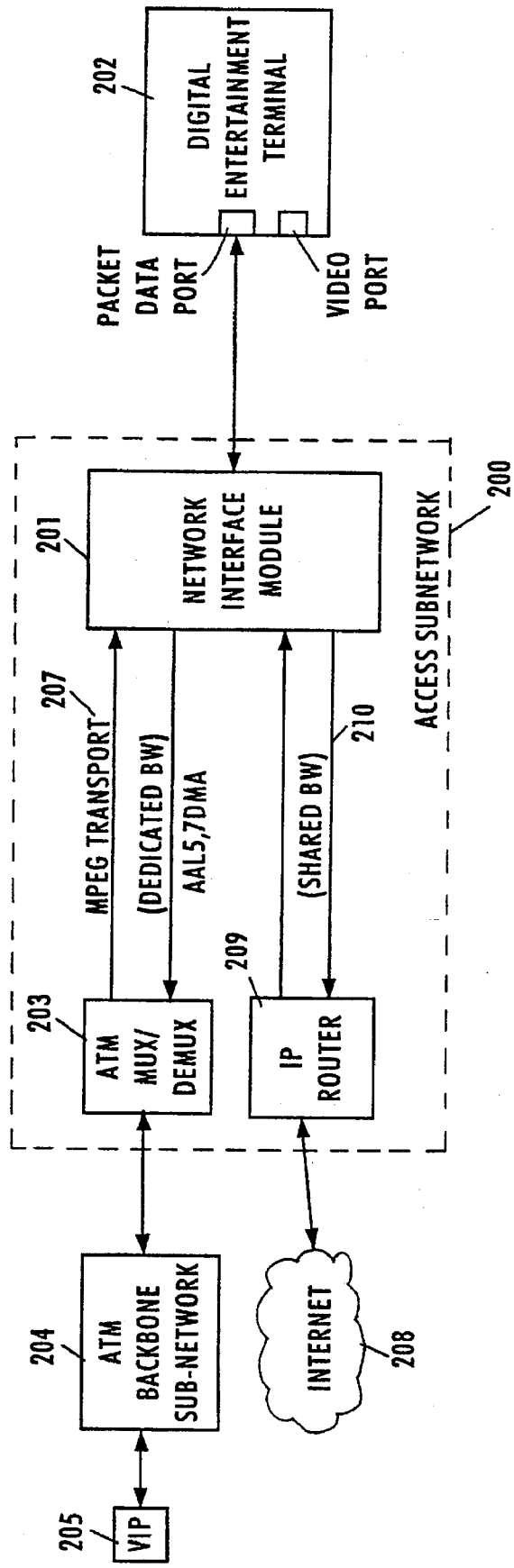
FIG. 2 is a partially logical and partially structural high level diagram illustrating a network architecture in a first preferred embodiment of the invention utilizing any data format.

In FIG. 2, element 200 is an access subnetwork bounded on the end user side by network interface module (NIM) 201 connected to DET 202 and, optionally, a standard television set or personal computer (not shown). Element 200 is bounded on the other side by ATM MUX/DEMUX interface 203 connected to a VIP 205 through ATM backbone subnetwork 204. (Of course, any other connection providing ATM data could be connected to ATM MUX/DEMUX interface 203, and information providers other than VIP 205 could be connected to ATM backbone sub-network 204.)

A typical connection is between VIP 205 and an end user via DET 202 through access sub-network 200. There is a unidirectional path in the downstream direction from ATM backbone sub-network 204 to ATM MUX/DEMUX 203 within access sub-network 200. The downstream signalling and the video are preferably combined within ATM backbone sub-network 204 to generate one uni-directional physical connection to ATM MUX/DEMUX 203. The downstream signal processing portion of the ATM MUX/DEMUX may be constituted by a specific component by General Instrument called the ITEM-1000. The ATM MUX/DEMUX 203 also includes components providing upstream signal processing and protocol conversion for upstream signals transported through access subnetwork 200 to ATM backbone subnetwork 204.

FIG. 2 is partially logical insofar as it represents connections with bi-directional arrows. Physically, there may be different components and different paths (e.g., OC3C) to create the illustrated bi-directionality. In a particular installation, it may not be feasible to have both of the upstream and downstream connections combined at the ATM MUX/DEMUX 203 interface to ATM backbone sub-network 204. In such circumstances, the different channels may be physically separate.

Similarly, access sub-network 200 may incorporate any implementation in order to provide loop to the DETs 202 and upstream and downstream channels of specified quality and service to the DETs. The loop plant may be a hybrid fiber coax with an analog bus that is ADSL, it may be digital filter to the home, switched digital fiber to the curb, wireless, etc. However, in any implementation, the peculiarities of the access subnetwork are encapsulated so that from the outside it looks simply like an ATM network, with bi-directional capability in and bi-directional capability out. The external interfaces provide a consistent signal to a wide range of end users and information providers.

One of the distinguishing features of the invention is that there is no specifically required format, such as IP, for routing to or through access subnetwork 100 or over the NIM to DET interface, other than the back plane and local protocols used to transfer data across the local interface. Access subnetwork 200 will then pass the data transparently and deliver it at the other end, and vice versa in the other direction. Hence, the term "any data".

Figure 3:
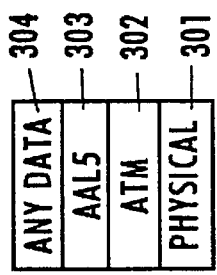
FIG. 3 illustrates the relationship of the any data format to other formats and protocols used in the link between the ATM backbone subnetwork and the access subnetwork in FIG. 2.

FIG. 3 illustrates the protocol stack of data transport on the link between ATM backbone subnetwork 204 and a standard ATM MUX/DEMUX 206 in access sub-network 200. A connection is set up basically as a cell relay service without any additional protocol above physical layer 301, ATM layer 302 and AAL5 ATM adaptation layer 303. AAL5 adaptation layer 303 is an adaptation of ATM used to place MPEG encoded data or other types of data into ATM format. Once the quality of service is specified and the ATM connection is established, the any data 304 is transported to the other end of access subnetwork 200 via transport 207 without specific limitations imposing requirements on users.

For example, a VIP transmitting data using the stack of FIG. 3 would convert a packet of source data, regardless of protocol, into an ATM adaptation layer 5 (AAL5) packet. The AAL5 packet, in turn, is mapped into payload data in a number of ATM cells. The resultant ATM cells are then encapsulated in the appropriate signaling protocol packets for the actual physical transport used on the network, e.g. SONET Synchronous Transport Signal-Level 1 (STS-1).

From the direction of VIP 205, the any data connection through access subnetwork 200 looks just like an ATM connection and the user connected via NIM 201 looks as if they were connected directly to ATM backbone subnetwork 204. FIG. 2 shows transport 207 to be bi-directional. However, the upstream and downstream channels may be carried over different areas of spectrum or even by different equipment and physically routed in different places. Some equipment Such as multiplexers and demultiplexers take the downstream ATM data coming from the ATM backbone sub-network 204 and put that within MPEG transport to get it across to NIM 201.

Figure 4:
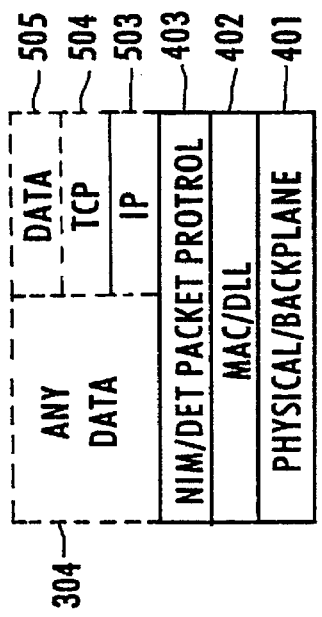
FIG. 4 illustrates the relationship of data to formats and protocols of the data packets transmitted between the network interface module and the digital entertainment terminal in the network of the first preferred embodiment of the invention shown in FIG. 2.

NIM 201 then takes the downstream data and routes it to the packet data port on the DET. The format above the packet protocol for the local last leg of the connection is shown in FIG. 4. Any Data 304 shown in FIG. 4 is the same any data 304 from VIP 205 shown in FIG. 3.

DET 202 preferably has at least two physical ports: a packet data port and a broadband (e.g. video) port. Each NIM 201 filters out the data destined for its corresponding DET and separates out the different types of data to correspondingly different ports of the DET. For example, there may be a specific port that accommodates MPEG encoded video and another one for analog video. There may also be a port on DET 202 for packet data that is transported over the any data connections. NIM 201 terminates the MPEG transport, puts the data into the packet protocol for the local NIM/DET interface, and sends it on the proper port of the DET.

The NIM to DET interface at the any data port operates at a specific lower layer protocol, preferably at a very high speed such as four hundred kilobits per second. FIG. 4 illustrates the protocols in the preferred embodiment of the invention. Above physical backplane 401 is the basic data link layer (MAC/DLL) driver specification 402 which allows multiple protocol stacks to be shared on the interface including the basic NIM/DET packet protocol 403. The interface and NIM/DET packet protocol 403 are preferably standardized to be the same for each of the NIMs on the network so that the NIMs and DETs can be interchanged although some NIMs or DETs may provide additional capabilities to users, different ports for different types of TV hookups, either base band or RF channel 3, 4, etc. There may be other access ports on the back of enhanced DETs, such as an RS-232 port into the main portion of the DET or a PCMCIA port for flash memory cards.

NIM 201 has a high speed downstream port from the MPEG data stream and it has a two-way NIM/Host interface packet data port for signaling or for transfer of any data 304. Each DET 202 can send packets on an upstream connection with a particular connection identifier that has been assigned when the DET established the connection. NIM 201 formulates the content of these packets into AAL5 packets and sends them through access subnetwork 200 using the MAC/DLL and physical layer protocols required by the particular subnetwork 200. The packets ultimately become full ATM on the interface to ATM backbone subnetwork 204 for transport on to VIP 205. Consequently, the network can do two-way communication of any type of data that can be adapted into AAL5. The user appears to be connected directly to the ATM backbone sub-network and does not receive anything less in terms of data functionality even though they are connected through a more restrictive piece of the network, such as the access subnetwork or loop distribution system.

AAL5 is a packing scheme unrelated to any specific service. Generally, any non-real time service can be transported by AAL5. Although AAL5 is preferable, any present or future AAL adaption layer could be used. Of course, the transported data may be IP formatted data but it does not have to be. The transported data may be bits of audio information, bits of video in a form other than MPEG, or the bits off of any digital board in the world as long as they can be formatted into AAL5. However, if the audio information is a voice conversation the asynchronous aspect of the protocol layers and the process of packetizing the data will greatly reduce the quality of the voice signals.

Such a connection, using the network shown in FIG. 2, may provide an additional access to Internet. The VIP can be a port on the Internet, and the user can run Internet IP protocol. The access subnetwork will treat the IP protocol information as an end to end, point to point, connection and relay IP formatted data from the VIP (Internet port) to the DET 202. Access subnetwork 200 would not do anything with the packet that is carrying IP and would treat it as a transparent bit relay all the way to the settop. So, to the extent that the data is IP formatted data, the only indicator is that the data says that it's got this many bits in this tray.

Figure 5:
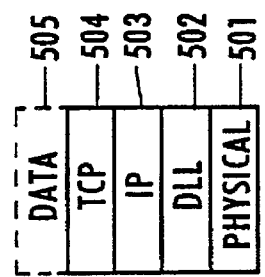
FIG. 5 illustrates the format of internet data provided to the access subnetwork in the network shown in FIG. 2.

It may nevertheless be desirable to provide an alternative means of access to LAN type applications or to the Internet that does not use dedicated bandwidth with guaranteed quality of service. In FIG. 2, the Internet is shown as a cloud 208 connected via a standard IP router 209 to NIM 201 over shared bandwidth transport 210. FIG. 5 shows the basic protocol stack for the interface between Internet 208 and IP router 209. Above physical connection 501 and DLL 502, is the basic internet protocol (IP) 503, the transmission control protocol (TCP) 504, and finally, the data 505.

DET 202 in the preferred embodiment of the invention receives the IP 503, TCP 504 and data 505 over the NIM to DET interface. In the upstream direction, DET 202 formulates the IP packets, puts an IP address on them, and sends them out. However, unlike known systems, it is NIM 201 which controls the placement of IP formatted data on the shared upstream channel 210 through IP router 209 to the Internet or other applications. In the downstream direction, the NIM controls which packets cross the NIM/DET interface. In the preferred embodiment of the invention, NIM 201 forwards only the IP packets destined for its corresponding DET and routes the IP packets from its corresponding DET onto shared bandwidth transport 210.

Although shown as part of access sub-network 200 in FIG. 2, NIM 201 may instead be physically located at the customer's premises, preferably as a card inserted into the back of DET 202 in a manner similar to the way a modem is installed in a PC. There may be a back plane, with one card for the NIM and another card for the MPEG demultiplexer, with a bus between NIM 201 and DET 202. Nevertheless, even in such an implementation, NIM 201 is logically part of access subnetwork 200 and is functionally controlled as an element of the access subnetwork. Access subnetwork 200 still has control over what NIM 201 sends upstream to VIP 205 and downstream to the main portion of the DET.

Figure 1:
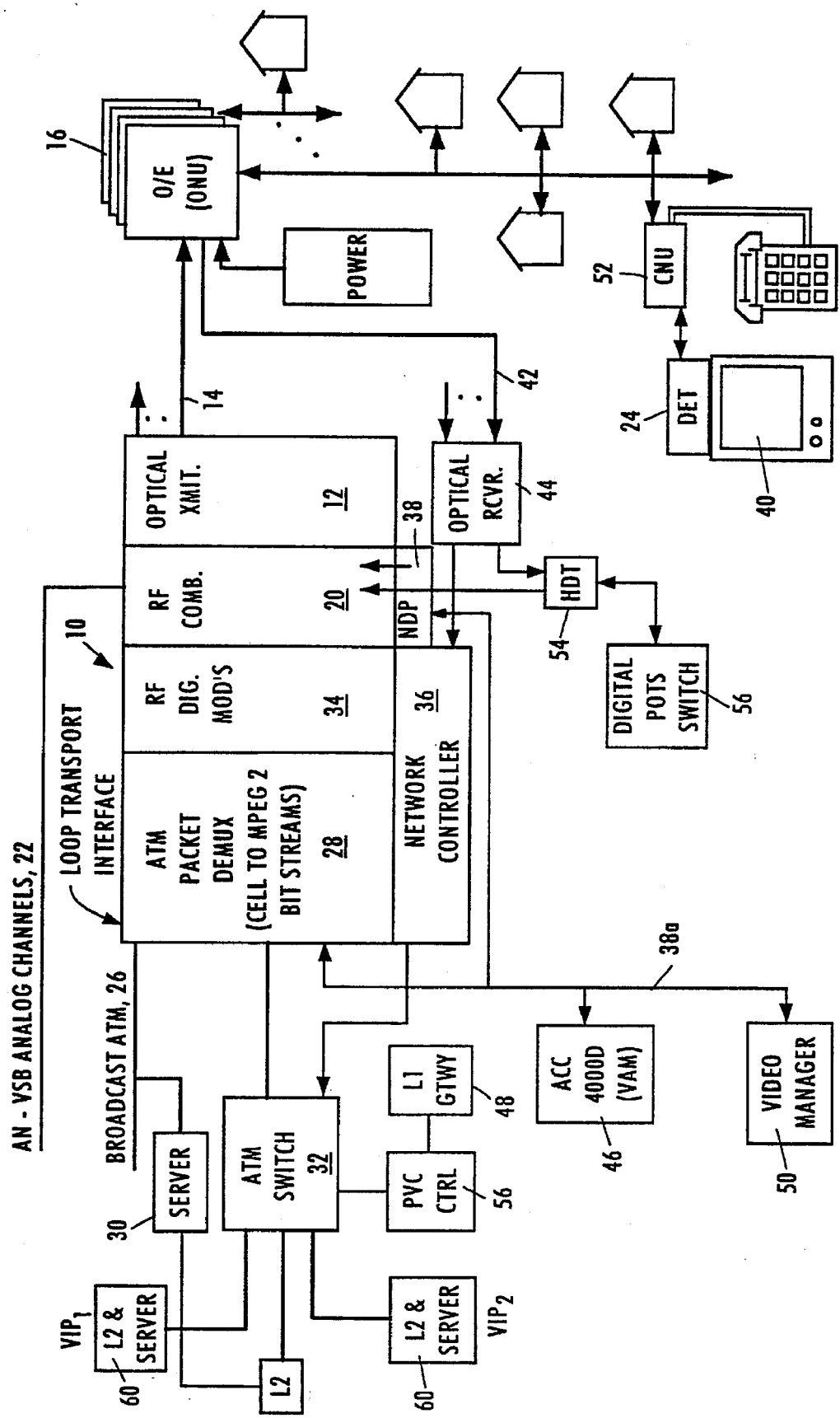
FIG. 1 illustrates a known video network utilizing a hybrid fiber-coax system which provides RF transport of both analog and digital broadband services.

In an HFC architecture such as that shown in FIG. 1, the data is available to the NIM at all times. Nevertheless, NIM 201 provides security since it contains secure memory and secured processing circuits to keep the user out of the access subnetwork.

In an ADSL architecture or switched digital architecture, the NIM does not automatically forward data through a specific connection in response to local control signals from the DET. Instead, the NIM goes back into the network, possibly to an HDT, and asks it to forward data through an available connection. In the ADSL or switched architecture, there is more security in the network, because of the built-in switch selectivity regardless of whether the NIM is located in the DET or in the access subnetwork.

The NIM could be installed on a side of a house with the NIM to DET interface extended throughout the house. Alternatively, the NIM could be installed at any point in the network with the packets securely transported from the NIM to one or more DETS along a dedicated path. The functionality of the NIM could exist at any point within the network as long as the path from that point to the DET is a dedicated path.

One strong advantage of the any data format is that it provides a generic capability to enable almost any sort of application since the DET may have an associated remote control unit, television, or personal computer, etc. Software can be loaded into the main processor of the DET for any video or non-video application with displays output to the television. Network based applications from the Level 1 gateway may download menus or other graphics through the DET in a connection setup identical to a connection with a VIP.

The process of setting up an any data connection is almost identical to setting up a video connection. The same messages happen in the same sequence involving the same parties. The same signalling sequence is used to set them both up and tear them down. Within ATM backbone subnetwork 204 the connections are the same, although video and data Connections may use different bandwidths.

The only thing that is different is that there is a connection information element in one or more of the connection set-up messages that informs access subnetwork 200 whether the data is any data or MPEG encoded data. Access subnetwork 200 is responsive to the connection information element to handle the two types of data differently at the software level. As far as the physical layer structure of access subnetwork 200 is concerned, the subnetwork does not distinguish between any data format or TCP/IP. The distinction comes about in the protocol handshake between access subnetwork 200 and VIP 205. The ATM MUX/DEMUX 203 understands that the program numbers, the case assignment and those things happen at the software layer, not at a physical layer.

Figure 6:
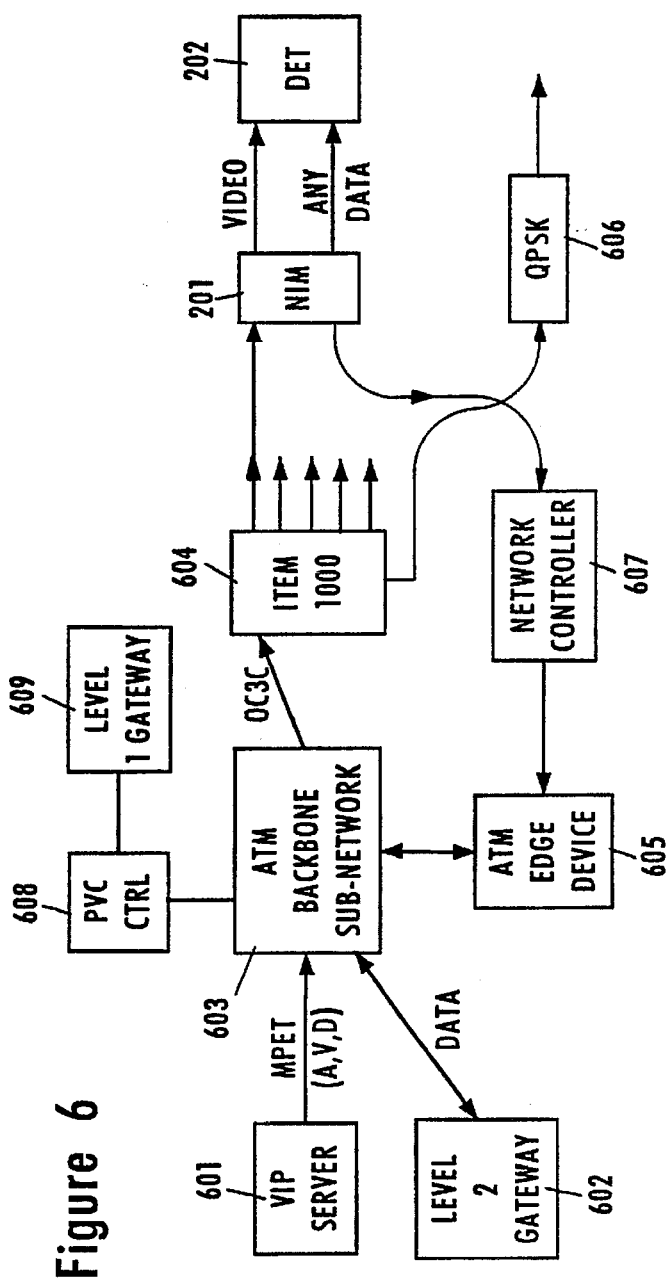
FIG. 6 is a structural drawing of the elements in the network of a second preferred embodiment of the invention.

FIG. 6 is a high level connectivity diagram showing a connection between a video information provider (VIP) server 601 and a Level 2 gateway 602 associated with VIP server 601 that is pumping MPEG encoded data to a NIM 201. The MPEG encoded data includes video, audio and private data. The network of FIG. 6 is a simplified representation of the preferred full service network disclosed in commonly assigned application Ser. No. 08/413,207, filed Mar. 28, 1995, entitled "ATM Packet Demultiplexer for Use in Full Service Network Having Distributed Architecture" (attorney docket No. 680-116) the disclosure of which is incorporated herein in its entirety by reference.

The Level 2 gateway communicates two-way signalling data via an any-data connection to the ATM backbone subnetwork 603. Also, another connection may be provided either to the same place as VIP server 601 or some other building that is associated with VIP server 601, to some other device(s) that has a bi-directional connectivity to the ATM backbone network 603. Cells relating to different connections have different VPI/VCI values. The ATM backbone network 603, because of its routing based on VPI/VCI, puts all the MPEG encoded data into one unidirectional optical connection that goes to an ATM demultiplexer referred to as ITEM 1000 604 in a central office that is serving an end user.

The connections from VIP server 601 and level 2 gateway 602 inside the ATM backbone are merged into a port that goes to the ITEM 1000 via an OC3C transport and then goes down a stream toward the NIM 201. Level 1 gateway 609 and a Permanent Virtual Circuit (PVC) controller 608, similar to the elements in the network shown in FIG. 1, control the connections inside ATM backbone subnetwork 603. According to the preferred embodiment, the ATM switch 252 routes all ATM streams on the basis of the VPI/VCI of the cell streams. The ATM stream virtual path is controlled by the PVC controller 248, which provides switching control to the ATM switch 252 to set up the virtual paths in the ATM switch 252 from the source to the destination in response to assignments from the level 1 gateway 108. Thus upstream signalling traffic from to the level 1 gateway is routed along dedicated virtual paths.

Upstream data traverses a different physical connection from NIM 201 through network controller 607 and towards ATM edge device 605 which has a bi-directional connectivity to ATM backbone network 603. ATM edge device 605 has many other inputs and outputs that talk to the rest of the network. But from the perspective of network controller 607, ATM edge device 605 is carrying user data from the DET 202 to the VIP server 601, and the port between network controller 607 and ATM edge device 605 is a unidirectional port. ATM edge device 605 is responsible for formatting the user information for ATM transport and supplying the resultant ATM cells to ATM backbone 603. ATM backbone subnetwork 603 then provides that information to the bi-directional port that goes to Level 2 gateway 602 or to other data devices operated by the VIP.

In a typical example, there are at least three PID values for packets of a particular television type program encoded in MPEG II form, a first PID value for packets containing video, a second PID value for packets containing audio and another PID value for a packet containing a program map. There often are more than three PID's associated with the packets containing programming from one source. For example, there could be a data channel associated with the program which would include data for closed captioning for the hearing impaired and/or related control signaling information. There could be a number of audio elementary streams, for example, carrying respective different languages. The program map, in turn, specifies the PID values for the various packets containing video, audio and/or data from the particular source. In a combined MPEG packet stream carrying packets for two or more programs, the PID values for each program will be unique, and each such program is assigned a unique program number (PN).

MPEG encoded data and any data are distinguished by a table or other type of unique mapping within the ITEM 1000, that is established and updated by information from an access subnetwork controller such as a video manager (not shown). This mapping table defines the correspondence between VPI/VCI values of cells received on the input port and MPEG packet identifiers (PIDs) and the specific output ports of the ITEM 1000. Certain PIDs, for example, match uniquely certain numbers associated with a DET, a video information provider, and the Level 2 gateway and the user. NIM 201 in turn distinguishes any data from other information based on PID values in the respective MPEG II packets. This distinction between any data, video MPEG or other data takes place through a mapping at a software layer, not a physical layer, in each element of the network.

The MPEG II standard also requires that a packet stream containing packets relating to one or more programs includes a program association table in a packet identified by PID 0. The program association table maps each program number with the PID value associated with the program map related to that source. In accord with the standard, each ATM demultiplexer or ITEM 1000 604 combines MPEG packet streams for the four (or more) input programs and the appropriate any data transmissions for output on one of the broadband rails and constructs and adds a PID 0 packet containing the program association table to the combined stream.

The any data transmission from the Level 2 gateway 602 has a certain VPI/VCI associated with it. The VPI/VCI associated with this data is different than the VPI/VCI associated with the MPEG packet output from VIP server 601, and communication takes place so that the network and the ITEM 1000 604 know about the difference in VPI/VCI values and therefore map the VPI/VCI values into different PID values.

The any data VPI/VCI and the vPI/vCI associated with MPEG encoded data also are mapped into different program numbers, such as PN1 and PN2, that are assigned to be unique within a transport MPEG multiplex stream. The ITEM 1000 has five output rails, each of them carrying a multiplex MPEG transport of 27 megabits per second, and one 1.5 megabit per second out of band signalling rail that goes into a QPSK modulator circuit 506. The MPEG transport stream (27 megabits per second) contains MPEG packets for four or more programs as well as data for one or more any data connections. The ITEM 1000 604, for example, knows that a video program coming out of, or the VPI/VCI assignment that goes with, program number one, and a VPI/VCI of any data that goes with program number two, has to be put the on one of the transports because it is associated with DET 202.

Any data format data packets and MPEG encoded packets are mapped with different program numbers. The program numbers are stored in NIM 201 so that NIM 201 can distinguish between the any data packets and the MPEG packets. The program number indicates which one has to be depacketized and submitted to a MPEG decoder and which one has to be handed to an any data processor within DET 202. NIM 201 uses the program numbers to separate the MPEG packets and hand the video to an MPEG decoder at a video port and to forward the any data to an any data processor at an any data port.

Figure 7:
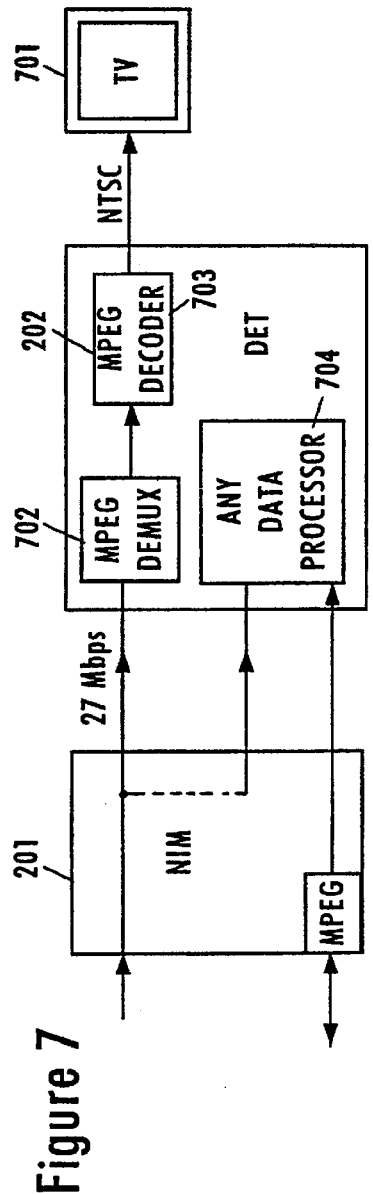
FIG. 7 illustrates a network interface module and a digital entertainment module used in a preferred embodiment of the invention.

FIG. 7 is a block diagram of the basic parts of the NIM and DET helpful in showing the manner in which any data is handled in a preferred embodiment of the invention. There is generally a 27 megabits per second output rail going into MPEG demultiplexer 702 and MPEG decoder 703 which create an NTSC signal to be displayed on TV 701. However, any data can appear on any one of the 27 megabits per second output rails or on the QPSK rail out of the ITEM 604. If the any data is coming from a VIP, it will appear on one of the 27 megabits per second output rails because the entire output of the VIP always goes in band and will appear on one of those rails. In such a case, NIM 201 will then have to look at the data on the 27 Mbps output rail using either the program number or the PID value allocated to the any data, to extract the portion of the data on the 27 Mbps output rail corresponding to the any data and route it to any data processor 704. If NIM 201 receives any data on the QPSK channel (Out-of-band), it knows for sure that the any data is going to any data processor 704 and is not going into MPEG demultiplexer 702 and MPEG decoder 703.

MPEG demultiplexer 702 performs standard MPEG processing to grab video, audio and related data according to the standard MPEG transport format and then demux it to get to the audio, video and data. MPEG decoder 703 then decodes that to render the NTSC signal.

There is also MPEG decapsulation of the data at 1.544 or 2.048 megabits per second on the bottom bi-directional arrow (either downstream into the QPSK or upstream into the network controller) which is contained in headers of the MPEG standard. NIM 201 has a QPSK demodulator which receives the data, demodulates the data, decapsulates the MPEG header, and derives a bit packet of data. So in a sense it performs MPEG processing to remove the header information and hand clear data to the any data processor, but it is decapsulation of header and data rather than decoding to create an NTSC signal.

Figure 8:
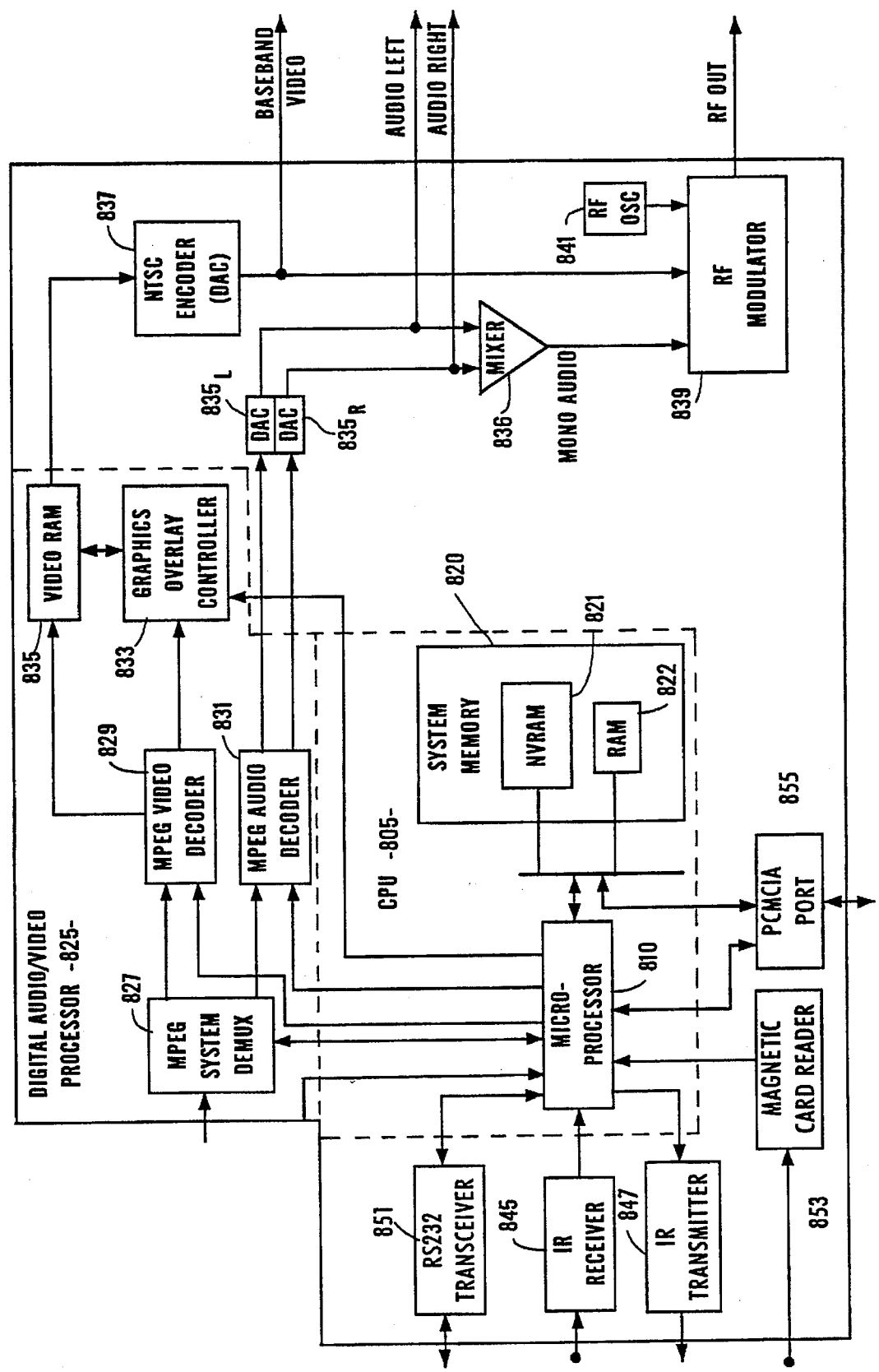
FIG. 8 is a block diagram of the digital entertainment terminal (DET) 202 in the preferred embodiment of the invention.

FIG. 8 discloses a digital entertainment terminal (DET) 202 in accordance with a preferred embodiment of the present invention. As mentioned previously, network interface module 201 may take the form of a plug in module. In one embodiment, NIM 201 would be similar to a daughter board or option card which can be plugged into a back plane of a personal computer (PC). In such an embodiment, typically a technician could replace the module in either the field or the shop, to modify a DET to connect to and communicate over a different network, and the technician would modify associated communications control software in the system memory. Alternative implementations may use a user replaceable cartridge type network interface module, similar to a video game cartridge, which may include memory in the module for storage of the communications control. As a further alternative, the network interface module could include a digital signal processor controlled by the CPU of the DET and input/output connections compatible with all of the digital broadband networks currently available. The downloaded operating system software stored in the system memory of the DET would control operations of the digital signal processor to send and receive signals in accord with the particular network the subscriber chooses to connect the DET to.

The DET 202 includes a CPU 805, comprising any suitable microprocessor 810 and associated system memory 820. The system memory 820 preferably includes at least 2 Mbytes of volatile dynamic RAM 822 and 1 Mbyte of non-volatile RAM 821. The microprocessor 810 includes a small amount of ROM (not shown) storing "loader" programming needed to control wake-up. An EPROM memory (not shown) also may be added.

A digital audio/video signal processor 825, controlled by the CPU 805, produces digital uncompressed audio and video signals from the audio and video MPEG encoded packets received from the network through the video port of NIM 201. The audio/video processor 825 includes an MPEG system demultiplexer 827, an MPEG video decoder 829, an MPEG audio decoder 831, a graphics overlay controller 833 and at least two frames (e.g. 8 mbytes) of video RAM 835.

The MPEG system demultiplexer circuitry 827 recognizes packets in the MPEG data stream received over the broadband (video) port of NIM 201 based on PID values and routes the packets to the appropriate components of the DET. For example, the MPEG system demultiplexer 827 circuitry recognizes audio and video packets of a selected program in the MPEG data stream and routes those packets to the decoders 829 and 831, respectively.

The MPEG video decoder 829 decompresses received video packet signals to produce a digital video signal, and the MPEG audio decoder 831 decompresses received audio packets to produce left and right digitized stereo signals. For at least some functions, the MPEG decoders 829, 831 may be controlled in response to signals from the microprocessor 810. The MPEG video decoder 829 will internally include at least two frames (e.g. 8 mbytes) of RAM (not separately shown) for use as a frame reorder buffer during the MPEG video decoding process, and the MPEG audio decoder 831 also may include some buffer memory.

The video RAM 835 is not a specialized "video RAM" as that term is sometimes used in the television art. The RAM 835 is actually a standard digital data RAM, of appropriate size, which is used in the DET to store digitized frames of video data. The RAM within the MPEG video decoder 829 likewise consists of standard digital data RAM.

The graphics display generator produces displays of text and graphics data, such as the initial turn-on selection menu received over the signaling channel, in response to instructions from the CPU 805. The video RAM 835 sequentially receives each frame of digitized, uncompressed video information, as output from the MPEG video decoder 829. The video RAM 835 also receives digital information and read/write control signals from the graphics overlay controller 833 representing the several planes of text and graphics information and combines that information with the frames of decompressed video to produce composite video frames.

The graphics overlay controller 833 and the video RAM 835 actually cooperate to manipulate five different planes of video information, four of which can be active at any one time, to produce the composite video frame output signals. The individual planes comprise the decoded MPEG video frames, a cursor, two graphics/text image planes manipulated by the microprocessor 810 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 829. When no received video frames are to be output, either when none are received or when they are to be entirely replaced, the information from the graphics overlay generator 833 would specify a background and the active planes of text or graphic information. When received video frames are combined with text and/or graphics, the composite video frames include the uncompressed received video frames with selected pixels thereof replaced with graphics or textual data display pixels specified by the graphics overly controller 833. In this last situation, the graphics overlay controller would deactivate the backdrop plane.

Under certain circumstances, the video RAM 835 also serves to freeze video frames. For example, when a video transmission ends for some reason, the RAM 835 will contain the video and associated graphics information for the frame last received and displayed. The DET can continue to output this frame as a still video output signal for some period of time.

The DET also includes audio and video digital to analog converters and appropriate drivers to produce output signals compatible with a conventional television set. Specifically, the converter and driver circuitry of the DET 202 includes audio digital to analog converters (DAC's) $835_L$, $835_R$, an audio mixer 836, an NTSC encoder 837, and an RF modulator 839.

The DAC's $835_L$ and $835_R$ receive the uncompressed left and right digitized audio signals output by the MPEG audio decoder 831. In response, the DAC's $835_L$ and $835_R$ produce baseband analog audio signals for output to individual baseband output terminals. The audio mixer 836 also receives the baseband audio signals from the DAC's $835_L$ and $835_R$. The mixer 836 combines the left and right analog audio signals to produce a monaural audio signal as the audio input to modulator 839.

The NTSC encoder 837 also performs a digital to analog converter (DAC) function. In response to the digitized video output signals from the video RAM 835, the NTSC encoder 837 produces a baseband analog video signal in standard NTSC format. The baseband NTSC video signal is supplied to an output terminal of the DET 202. The baseband NTSC video signal is also supplied to the RF modulator 839. The RF modulator 839 responds to the mono audio signal, the NTSC Video signal and an RF signal from a local RF oscillator 841, to produce a standard RF television signal on an available TV channel, typically channel 3 or channel 4.

The DET 202 of the present invention may also include a number of additional interface devices. In the example illustrated in FIG. 8, the DET 202 includes an IR transmitter 847 that responds to digital data signals from the microprocessor 810 and outputs corresponding IR signals for wireless transmission. The IR transmitter 847 and IR receiver 845 may operate together to provide a two-way wireless data communication link to some remote device, such as a personal data assistant (PDA) or pocket organizer. Alternatively, the IR transmitter may send signals to a remote display device for use in a service not requiring the TV set. For example, in an audio on demand service, the IR transmitter would send display data to an LCD display located near the user's stereo system.

The illustrated DET also includes an RS-232 transceiver 851 connected to the microprocessor 810. An RS-232 port is a standardized two-way serial data interface typically used for connecting computers to peripheral devices, such as modems. In the present system, the RS-232 transceiver 851 might provide a serial data connection to an external personal computer (PC), such that the DET permits communications between the PC and the Video Dial Tone network. Alternatively, this port might connect the DET to a printer, e.g. to print coupons during home shopping/browsing services. A hand-held diagnostic terminal would also connect to this port during servicing of the DET. The communications and protocols offered by the DET through the transceiver 851 would be controlled by the operating system and applications program software downloaded into the system memory 820.

FIG. 8 also shows the DET 202 including a magnetic card reader 853 connected to the microprocessor 810. This reader 853 could be used to scan credit card information encoded on magnetic strips on commonly available credit cards. In a home shopping and purchasing service, controlled by the downloaded software, the user would scan their own credit card through the magnetic card reader 853 as part of the payment operations. The reader could also have magnetic write capabilities to perform debit card operations.

The illustrated DET 202 further includes a personal computer memory-card interface adapter (PCMCIA) port 855. This is a two-way interface for connection to and communication with a flash memory module, such as is now incorporated into advanced "smart card" devices. In a medical service, a user might communicate with a medical information database through DET 202 and the broadband network. The user's personal medical history information could be read from the smart card and subsequently updated on the smart card, through the PCMCIA port 855. Another use of this port might involve communication to a connected video game system to download video game software to the video game system and/or play interactive video games. Although specified as a "memory" port and mapped by the CPU as part of its system memory space, the devices connected to this port 855 can have other data processing capabilities, e.g. buffering and modem communication capability.

In the current implementation, the PCMCIA port 855 will carry 6 Mbits/s of data, but the port can be designed for higher speeds such as 20 Mbytes/s. Another use of this port would be for connection to an Ethernet card or other Local Area Network (LAN) card to permit data communications between the DET and one or more computers. The DET would provide the computers with communications services through the broadband network, for example to receive high speed downloads of new or updated software for those computers. Although similar functions are possible through the RS-232 transceiver 851, the data rate through the PCMCIA port 855 is much higher.

Figure 9:
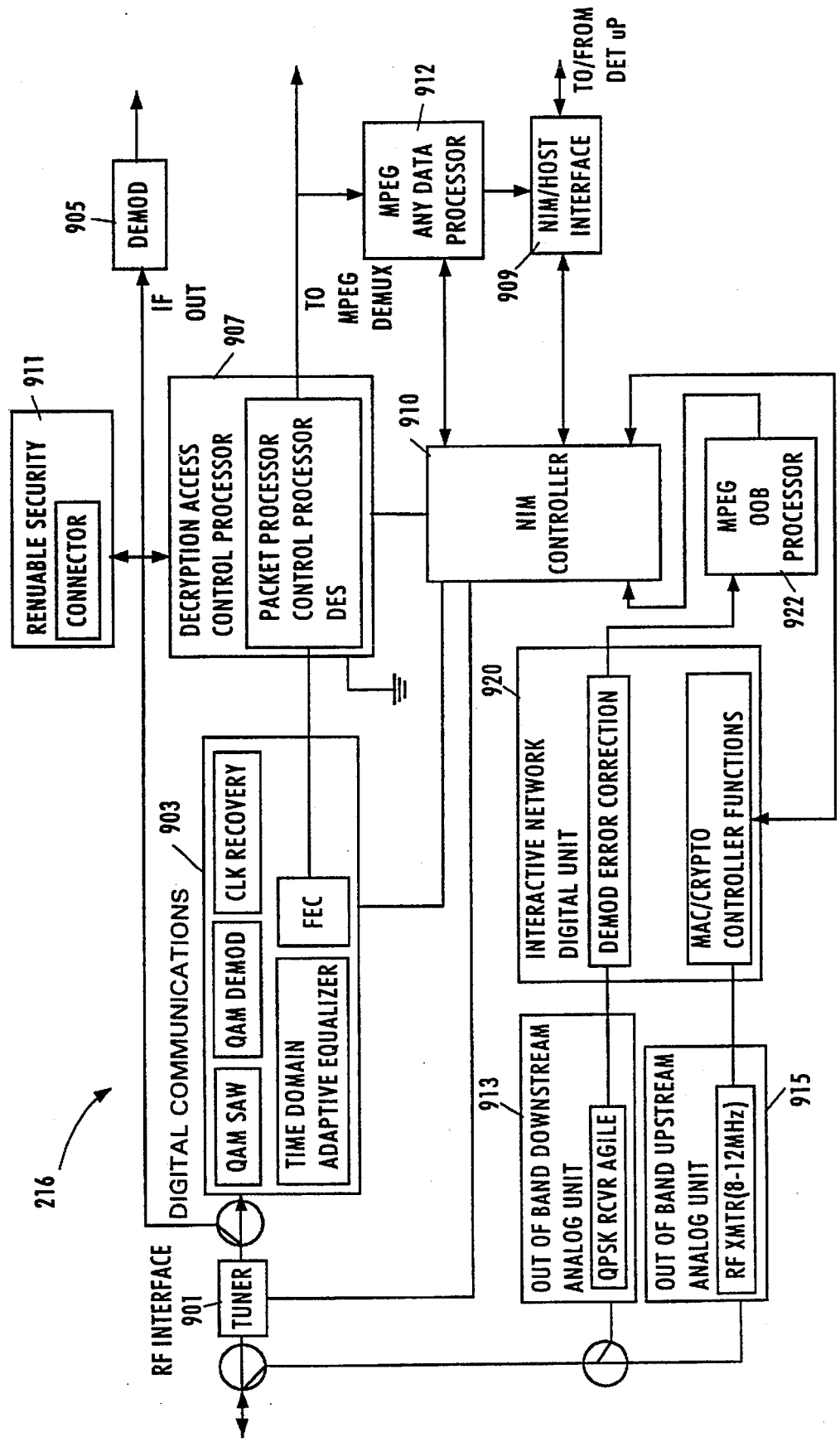
FIG. 9 is a detailed block diagram of the network interface module (NIM) including an any data processor in the preferred embodiment of the invention.

FIG. 9 depicts a preferred embodiment of NIM 201 in a hybrid fiber coaxial (HFC) architecture of the type disclosed in the above incorporated Ser. No. 08/413,207 application. The structure illustrated is based in part on the preference for the QAM modulation techniques for the digital video (broadband) signals and QPSK modulation techniques for the signaling data (narrowband) signals in the disclosed network. The tuner 901 selects a specific 6 MHz channel from the input spectrum and presents it at an intermediate frequency to the digital communications section 903, and through the IF output port to an analog video/audio demodulator 905. Although illustrated as part of the NIM, the demodulator may be an element of the host DET. The baseband audio video signals are selectively supplied as alternate outputs to the baseband output terminals and as alternate inputs to the RF output modulator 839 (see FIG. 8). The QAM demodulator block performs adaptive equalization, demodulation and forward error correction on signals in a specified one of the digital channel slots from the tuned RF channel and outputs a corrected serial baseband digital feed. The decryption processor 907, when properly authorized by a video manager and ACC-4000D, decrypts packets identified by selected MPEG PIDs, as directed by the DET microprocessor, via the host interface 909 and the NIM controller 910. The composite MPEG transport multiplex with appropriately decrypted components is output from the NIM 201 to the host DET's demultiplexer and decompression circuitry as shown in detail in FIG. 8.

In the illustrated preferred embodiment, communication between the host microprocessor 810 and the NIM 201 is via a dual port memory connected as the NIM host interface 909. The shared memory provides mailboxes and buffer regions which are used to transfer messages and commands between the host microprocessor and the NIM 201. Messages passing through this link include interactive traffic to the level 1 and 2 gateways, tuner control commands, specification of appropriate PIDs for decryption, general housekeeping data, etc., as well as any data.

The RF tuner 901 translates the desired channel, containing either digital or analog information, to a 43.75 MHz IF signal. The IF signal contains either digital or analog information. The tuner 901 utilizes a dual conversion technique with synthesized local oscillators, and has an input tuning range of 50 MHz to 860 MHz.

The 64 QAM demodulator comprises three submodules: DMAU, DMDU, and FEC. This module demodulates the QAM signal to digital form, and performs forward error correction (FEC) decoding, and it provides a baseband digital signal to the Decryptor Module. The DMAU contains the SAW filter, the QAM DEMODULATOR, carrier and clock recovery loop components and AGC control signal generation for the tuner 901. The DMDU contains an adaptive equalizer, AGC control signal generation for the DMAU, and error generation functions for the clock and carrier recovery loops. The FEC module executes concatenated Viterbi (Trellis) and Reed Solomon error correcting functions.

The Decryptor Module 907 receives the baseband digital data information stream from the demodulator, and control/ authorization information from the NIM controller 510. When authorized, this module 907 decrypts the packets identified by appropriate PIDs in the data stream. The high speed data containing decrypted packets is then passed out of the NIM to the host terminal. This module employs a DES type decryption algorithm and a key hierarchy to provide access control and decryption. The specific algorithms may be modified through the use of a TV Pass Card which is inserted in the renewable security slot 911.

The physical layer interface between the NIM 201 and the local loop coax drop comprises a 64 QAM in-band transport multiplex receiver and frequency agile QPSK out-of-band receiver 913. A frequency agile QPSK transmitter 915 relays the upstream signal over an assigned default channel and/or dynamically assigned upstream signaling channels, typically in the 8–12 MHz band on the coaxial drop. The out-of-band receiver 913 monitors QPSK signals on an assigned downstream default signaling channel. Downstream signals on the default downstream signaling channel are demodulated by the receiver 913 and forwarded to the interactive network digital unit 920 for error correction. The MPEG-encoded out-of-band signals are then output to an MPEG out-of-band (OOB) processor 922. If the received MPEG-encoded signals have a PID value corresponding to the NIM network address or the DET address, the MPEG OOB processor 922 performs MPEG processing to recover the signaling data from the MPEG packets, and outputs the data to the NIM controller 910. If the data from the MPEG processor 922 is DET signaling data, the NIM controller 910 supplies the signaling data to the DET microprocessor via the NIM/Host interface 909; if, however, the data from the MPEG processor 922 is NIM signaling data, then the NIM controller 910 processes the NIM signaling data accordingly.

The series of QPSK elements 913, 915 and 920 in the lower portion of FIG. 9 does the decapsulation and hands off a 1.5 megabit per second digital bit stream to an MPEG processor 922 and NIM controller 910 to decide where it goes. If it's signaling information intended for the DET, NIM controller 910 passes it through the NIM/host interface 909 to the DET microprocessor. It is the responsibility of the NIM to distinguish that and separate the program numbers and the packet in such a way that element 907 is dealing with truly an MPEG demuxing function, and the data processing input is coming from the NIM.

Any data processor (ADP) box 912 provides information to NIM controller 910, in conjunction with the intake link from out of band processor 922, which indicates when to place any data on the bidirectional link, from interface 909. For example, the DET 202 may provide a PID value to the NIM controller 910 identifying an any data connection expected in the relevant transport stream selected and demodulated by the components of the NIM 216. The NIM controller 910 instructs the ADP 912 to J capture packets identified by the particular PID value. The ADP 912 strips the header information from those packets and thereby captures the any data information carried in the packet payloads. The ADP 912 supplies the captured data to the NIM/Host interface 909 for transfer as NIM/DET protocol packets to the microprocessor 810 within the DET 202. The microprocessor 810 serves as the any data processor. The microprocessor 810 may itself process the data, or it may supply the data to a peripheral device via one of the various interfaces of the DET.

Although described above principally for connections between VIPS and end users, the network of the present invention will also provide any data transport between end users. One VIPs equipment may provide the bridging between two calls established with two end users' DETs, or the ATM backbone subnetwork may provide the necessary cross connection. This two-way data transport between end users permits a variety of data communications, and in fact, will support voice transfer between users. For example, during a computer to computer session using an any data type connection, voice telephone grade signals may be digitized and transferred back and forth between users. As noted above, the asynchronous nature of the transport through the ATM backbone subnetwork may provide relatively low quality for the voice transmission. However, the convenience of not needing a telephone connection in parallel to the any data connection will often outweigh the voice quality limitation.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A network for transporting data signals of at least two different respective formats, at least one of said two different formats being any data and at least another of said two different formats being compressed broadband data, to at least one user, the network comprising:

a plurality of information providers, each one of said plurality of information providers providing one of said data signals of at least two different respective formats on a respectively different signal path, an access subnetwork receiving said data signals from said digital signal paths and transporting said data signals to said at least one user, said access subnetwork comprising:

an ATM demultiplexer for receiving a plurality of ATM cell streams representing said data signals of at least two different respective formats from a first group of said digital signal paths and for adapting and multiplexing payload data from said ATM cell streams into a consolidated stream of MPEG encoded data on a channel of dedicated bandwidth, and a network interface module (NIM) for receiving said consolidated stream of MPEG encoded data and recovering data from said consolidated stream of MPEG encoded data, said network interface module comprising a packet address processor for selectively outputting the recovered data as a plurality of data packet streams to said at least one user, each of said data packet streams being arranged on the basis of data packets having an assigned packet identifier address recognized by said packet address processor as identifying the format of respective packets contained in said recovered data; and a digital entertainment terminal (DET), responsive to said plurality of packet data streams, for recovering and processing said compressed broadband data from one of said plurality of packet data streams and for processing any data contained in another one of said plurality of packet data streams.

2. A network as recited in claim 1, wherein said ATM demultiplexer recovers said data of said any data format and said data of a compressed broadband format on the basis of VPI/VCI values specified for corresponding ATM cell streams, outputs said data of said any data format into a first MPEG stream of data packets having PID values assigned on the basis of said VPI/VCI values and outputs said data of a compressed broadband format into a second MPEG stream of data packets having PID values assigned on the basis of said VPI/VCI values.

3. A network as recited in claim 2, wherein said network interface module is located at the customer premises and is adapted to communicate with said digital entertainment terminal (DET) responsive to inputs from said at least one user, said NIM comprising:

means for recovering said compressed broadband data from said second MPEG stream of data packets having PID values corresponding to said identifier address of said NIM; and a NIM controller, responsive to said recovered out-of-band data stream.

4. A network as recited in claim 3, wherein encryption information is supplied by said data network to said NIM using said corresponding identifier address.

5. A network as recited in claim 4, wherein said NIM further comprises a decryption processor for decrypting said received MPEG data streams in accordance with a decryption key derived from said encryption information.

6. A network as recited in claim 2, wherein said first MPEG stream is output over a low-bandwidth signaling channel and said second MPEG stream is output over a high-bandwidth data channel.

7. A network as recited in claim 1, further comprising a level 1 gateway adapted to communicate with said at least one user via said access subnetwork using said data of said any data format, said network further comprising means for transmitting upstream information from said at least one user to said level 1 gateway.

8. A network as recited in claim 7, wherein said level 1 gateway supplies network information to said DET for said at least one user via said channel of dedicated bandwidth.

9. A network as recited in claim 1, further comprising an ATM backbone subnetwork adapted to transport said compressed broadband data to said access subnetwork, said ATM backbone subnetwork comprising a permanent virtual circuit (PVC) controller for maintaining high-bandwidth and low-bandwidth virtual circuits throughout said ATM backbone subnetwork.

10. A network as recited in claim 9, further comprising a level 1 gateway adapted to communicate with said at least one user via at least one of said virtual circuits using said data of said any data format and means for transmitting upstream information from said at least one user to said level 1 gateway.

11. A network as recited in claim 10, wherein said level 1 gateway supplies network information to said at least one user via one of said virtual paths corresponding to said high-bandwidth transport requirement.

12. A network as recited in claim 9, further comprising a level 1 gateway adapted to communicate with said at least one user via at least one of said virtual paths and further comprising means for transmitting upstream information from said at least one user to said level 1 gateway.

13. A network as recited in claim 12, wherein said at least one user has a digital entertainment terminal adapted to access one of said packet streams on the basis of said corresponding identifier value.

14. A network for transporting non-video signals of any format from a plurality of information providers to a plurality of video information users having digital entertainment terminals adapted to decode compressed data streams, the network comprising:

an ATM backbone subnetwork for receiving a plurality of ATM data signals from a plurality of information providers and for combining a first group of said ATM data signals into a consolidated broadband signal output as ATM cell streams, each cell having a specified VPI/VCI value;

a source of a second group of digital data signals;

an access subnetwork for receiving said consolidated broadband signal output as ATM cell streams and said digital data signals and outputting corresponding data packets to said digital entertainment terminals, said access subnetwork comprising:

an ATM demultiplexer for recovering said first group of said ATM data signals from said ATM cell streams in accordance with said specified VPI/VCI values and outputting the recovered ATM data signals as a plurality of MPEG encoded packet data streams, each of said packet data streams being arranged on the basis of data packets having an identifier address controlled by an ATM-to-MPEG processor on the basis of the VPI/VCI of corresponding ATM cells and format identifying information corresponding to the format of said non-video signal, over a dedicated bandwidth transport, a router for receiving said second group of digital data signals and forwarding said second group of digital data signals over a shared bandwidth transport, and a plurality of network interface modules, respectively corresponding to the digital entertainment terminals, for receiving said MPEG encoded data outputted by said ATM demultiplexer over said dedicated bandwidth transport, said second group of digital data signals forwarded by said router over said shared bandwidth transport, said identifier address and said format identifying information, each one of said plurality of network interface modules outputting data extracted from said MPEG encoded data and said second group of digital data signals to a corresponding digital entertainment terminal in accordance with said identifier address and said format identifying information.

15. A network as recited in claim 14, wherein said ATM backbone subnetwork transports an ATM cell stream including interactive data in MPEG format in an ATM stream from an interactive information provider to said ATM demultiplexer of said access subnetwork, said ATM-to-MPEG processor monitoring PID values of said interactive data in MPEG format.

16. A network as recited in claim 15, further comprising:

a permanent virtual circuit (PVC) controller coupled to said ATM backbone subnetwork, said PVC controller establishing high-bandwidth and low-bandwidth virtual paths for ATM streams to be transported through said ATM backbone subnetwork to said access subnetwork; and a level 1 gateway in communication with said ATM backbone subnetwork, said level 1 gateway adapted to communicate with a selected one of said network interface modules and said interactive information provider via said ATM backbone subnetwork.

17. A network as recited in claim 16, wherein said plurality of MPEG encoded packet data streams comprise a first MPEG encoded packet data stream containing said non-video signals of any format and having PID values assigned on the basis of said VPI/VCI values and a second MPEG stream of data packets containing compressed broadband data and having PID values assigned on the basis of said VPI/VCI values, and wherein said plurality of network interface modules are responsive to said first and second MPEG encoded packet data streams and provide said non-video signals of any format and said compressed broadband data to the corresponding digital entertainment terminals at separate ports of said corresponding digital entertainment terminals.

18. In a network providing communications services to a plurality of information users distributed throughout a serving area and comprising a network interface for receiving broadband data of any format from a plurality of information providers, an access subnetwork for distributing said broadband data of any format to a plurality of video end offices, said information users being arranged in groups served by a corresponding one of said video end offices, a method for transporting data of any format to said information users, comprising the steps of:

grooming a first group of received broadband data carried as ATM cell streams from said information providers to obtain groomed ATM data streams;

combining said groomed ATM data streams with a second group of received data to obtain a consolidated broadband data stream;

outputting said consolidated broadband data stream from said broadcast network interface to said access subnetwork;

in said access subnetwork:

transparently recovering said data from said groomed ATM data streams carried by said consolidated broadband data stream, and outputting said recovered data as a stream of MPEG encoded data packets over a dedicated bandwidth transport to a plurality of network interface modules;

in each of said network interface modules:

(1) separating MPEG encoded packets from the output stream into a first packet data stream corresponding to broadband data in an MPEG format and a second packet data stream corresponding to data in a format other than MPEG format, (2) selectively outputting at least a portion of said first packet stream to an associated digital entertainment terminal on the basis of an assigned PID value, (3) selectively supplying the second packet data stream based on an assigned PID value for processing payload data in a format other than MPEG format.

19. A method as recited in claim 18, further comprising the step of establishing with a permanent virtual circuit (PVC) controller a virtual path for an ATM stream to be transported through an ATM backbone subnetwork.

20. A multi-format data communication method comprising:

encoding broadband compressed data in packets of a standardized format;

adapting the standardized format packets into a first set of ATM cells having a first VPI/VCI value;

transporting first set of ATM cells through a switched backbone subnetwork to a port of an access subnetwork;

adapting data in any format other than the standardized format into a second set of ATM cells having a second VPI/VCI value;

transporting a second set of ATM cells through the switched backbone subnetwork to the port of an access subnetwork;

capturing the standardized format packets from the first set of ATM cells and mapping the first VPI/VCI value into a first packet identifier added to the standardized format packets;

capturing the any format data from the second set of ATM cells;

encapsulating the captured any format data into at least one packet of the standardized format;

mapping the second VPI/VCI value into a second packet identifier;

inserting the second packet identifier into said at least one packet of the standardized format;

combining the standardized format packets containing the first packet identifier and the at least one standardized packet containing the second packet identifier into a multiplexed packet stream; and broadcasting the multiplexed packet stream.

21. A method as in claim 20, further comprising:

receiving the multiplexed packet stream;

recognizing the second packet identifier contained in said at least one packet of the standardized format to capture and recover data from said at least packet one packet of the standardized format; and supplying the any format data to a processor.

22. A method as in claim 21, wherein said any format data comprises digitized voice information from a first user, said method further comprising the step of processing said digitized voice information to provide an audio presentation thereof to a second user.

23. A method as in claim 21, further comprising:

recognizing the first packet identifier contained in said standardized format packets to capture and recover broadband compressed data therefrom; and converting the recovered broadband compressed data to signals for driving an output device to present broadband information to a user in humanly perceptible form.

24. A method as in claim 20, wherein said standardized format packets conform to the moving pictures experts group (MPEG) standard.

25. A network as recited in claim 8, wherein a virtual path is established in said channel of dedicated bandwidth and said level 1 gateway supplies said network information to said DET for said at least one user via said virtual path.

\* \* \* \* \*